United States Patent [19]

Maury

[11] 4,354,208

[45] Oct. 12, 1982

[54] MAGNETIC RECORDING MEDIUM AND DIGITAL STORAGE DEVICE INCLUDING SAME

[75] Inventor: M. Christian Maury, Velizy, France

[73] Assignee: Compagnie International Pour l'Informatique, Paris, France

[21] Appl. No.: 76,332

[22] Filed: Sep. 17, 1979

[30] Foreign Application Priority Data

Oct. 19, 1978 [FR] France ............... 78 29847

[51] Int. Cl.³ .................................. G11B 5/09
[52] U.S. Cl. ........................... 360/40; 360/41
[58] Field of Search ............. 360/40, 41, 42, 43, 360/44

[56] References Cited

U.S. PATENT DOCUMENTS

| | | | |
|---|---|---|---|
| 2,954,267 | 9/1960 | Canepa | 360/40 |
| 2,969,526 | 4/1961 | Clapper | 360/40 |
| 3,218,618 | 11/1965 | Warren | 360/40 |
| 3,303,486 | 2/1967 | Young | 360/40 |
| 3,311,904 | 3/1967 | Talsoe | 360/41 |
| 3,356,934 | 12/1967 | Halfhill et al. | 360/51 |
| 3,373,415 | 3/1968 | Gabor | 360/44 |
| 3,732,364 | 5/1973 | Tevedz | 360/40 |
| 4,134,138 | 1/1979 | Cardot et al. | 360/39 |
| 4,151,571 | 4/1979 | Cardot et al. | 360/77 |

FOREIGN PATENT DOCUMENTS

| | | | |
|---|---|---|---|
| 1474390 | 11/1965 | Fed. Rep. of Germany | 360/40 |
| 2346806 | 3/1976 | France | 360/39 |
| 2365178 | 9/1976 | France | 360/39 |

OTHER PUBLICATIONS

"Sector Servo Method"–Deremer et al., IBM TDB, vol. 20, #8, Jan. 1978, pp. 3243-3247.
Institute of Elec. & Electronic Eng., Digest of Papers from Compcon; 2/77, pp. 162-164.
"Circuits for Digital Equipment" by Dakin & Cooke, ©1967, pp. 298 & 299.
"Digital Magnetic Recording" by Hoagland, ©1963, pp. 128 & 129.
"Magnetic Tape Instrumentation" by Davies, ©1961, pp. 52 & 53.

Primary Examiner—Vincent P. Canney
Attorney, Agent, or Firm—Lowe, King, Price & Becker

[57] ABSTRACT

Cells of abutting magnetic disk tracks represent binary zeros and ones by having zero and one magnetic polarity transitions. The transitions in each cell for binary bits having the same value occur at the same relative place within the cell. A head positioned to straddle a pair of adjacent tracks simultaneously reads the magnetic transitions. Multiple successive cells along the lengths of the first and second abutting tracks provide only information to enable the head to be positioned to centrally straddle the abutting tracks. Aligned head positioning cells of abutting tracks have differing numbers of the transitions to represent the zero and one values. Even and odd numbered head positioning cells of a track respectively represent the zero and one value. Odd and even numbered head positioning cells of the abutting track respectively represent the one and zero binary values.

10 Claims, 18 Drawing Figures

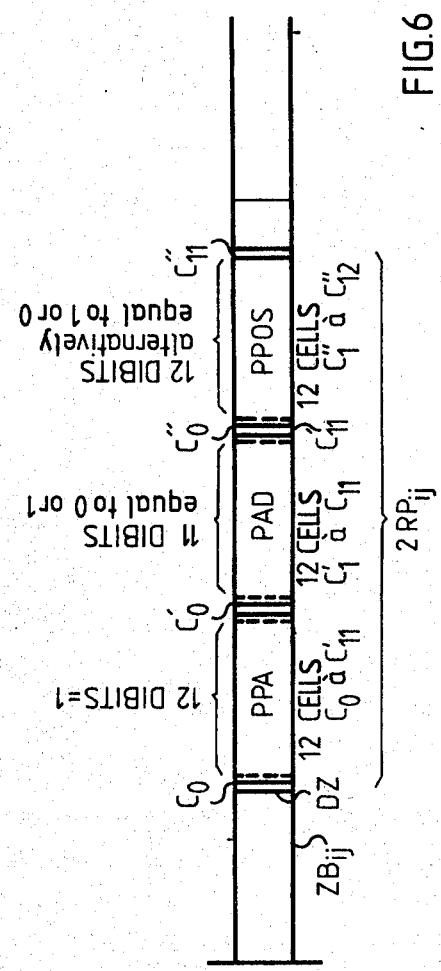
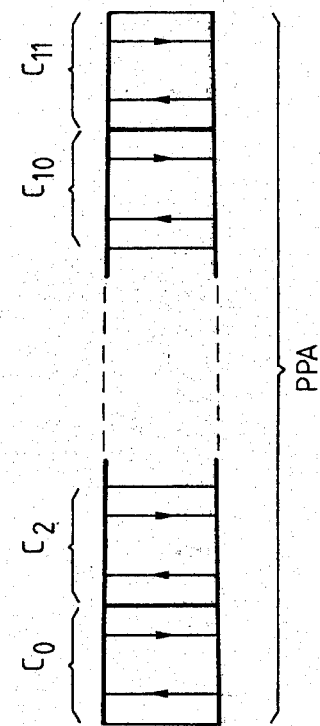
FIG.6
FIG.7

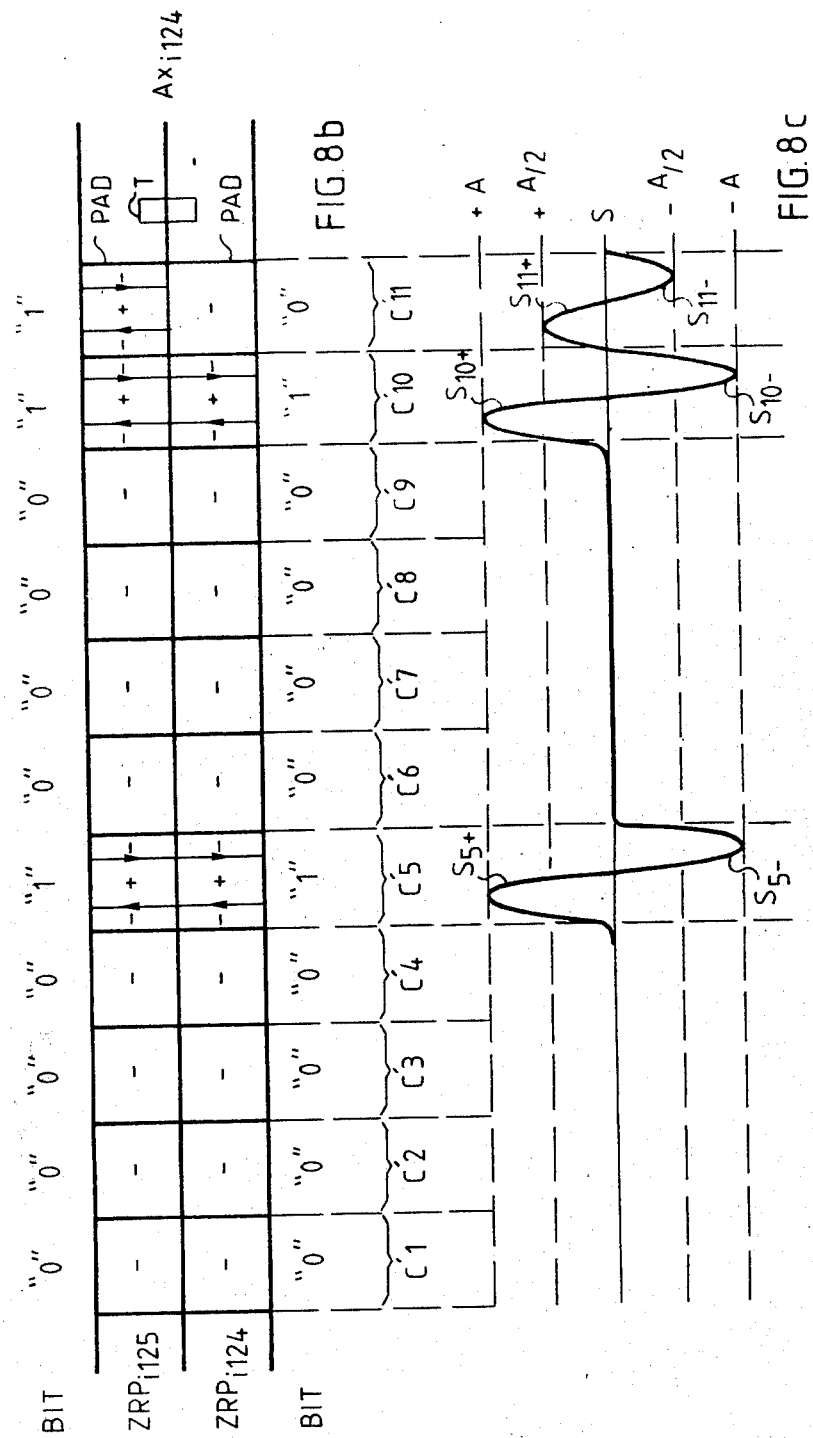

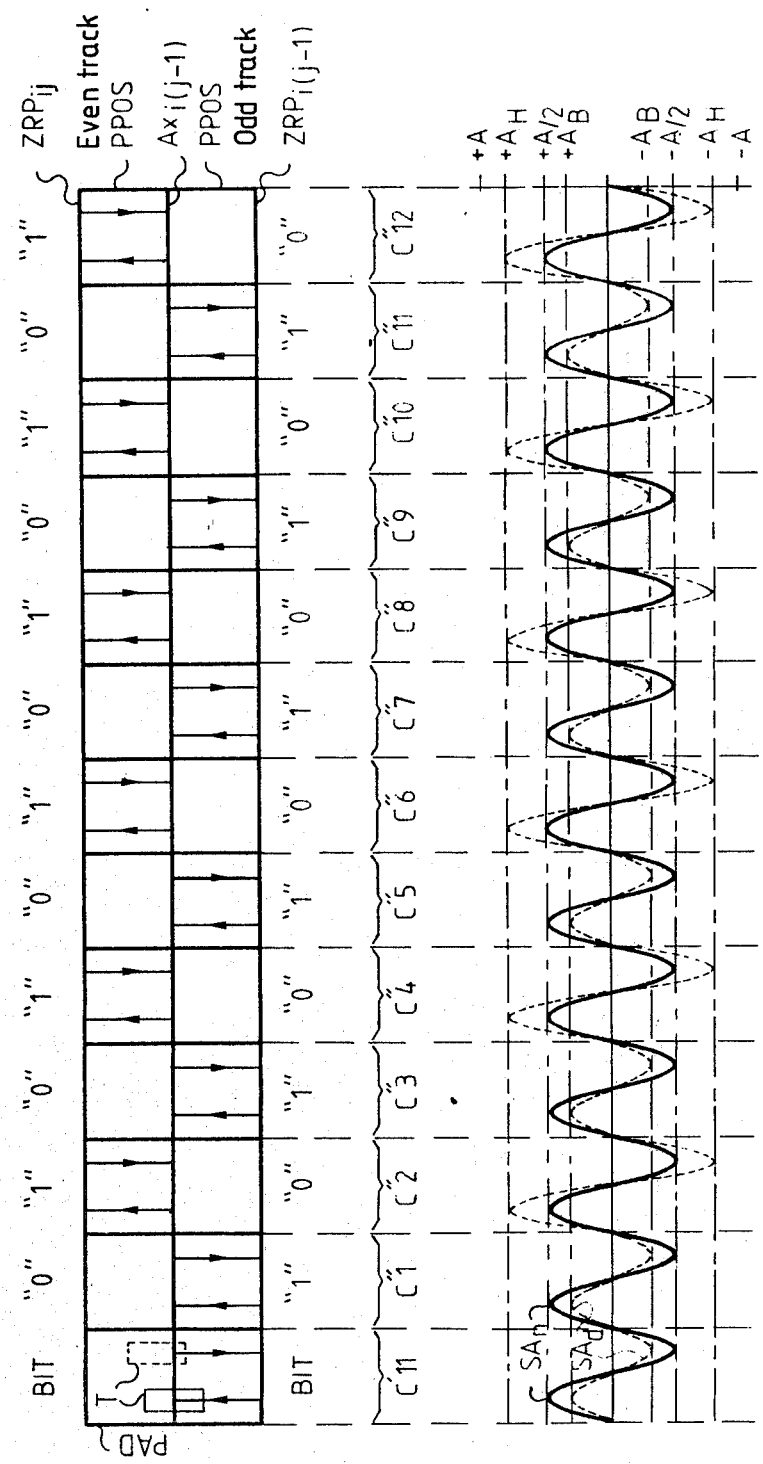

MAGNETIC RECORDING MEDIUM AND DIGITAL STORAGE DEVICE INCLUDING SAME

FIELD OF THE INVENTION

The present invention relates generally to digital storage devices and more particularly to a digital storage device comprising a magnetic storage medium wherein binary bits having first and second values are respectively represented as cells having differing numbers of magnetic polarity transitions.

BACKGROUND ART

In data processing systems, magnetic disc memory systems are frequently used because they have large storage capacity and require a relatively short time for a magnetic read/write head to access data contained anywhere on discs of the memory from the moment the head receives an instruction to access the data. The magnetic discs are driven at constant rotational velocity by an electric motor.

A magnetic disc carries coded data, usually in binary form, on both faces of the disc in concentric circular recording tracks having a width that does not exceed a few hundredths of a millimeter. The tracks are identified by allotting them an address or serial number j (j being a whole number) from 0 to (N−1), where N is the total number of recording tracks. The tracks having addresses (j−1) and (j+1) are adjacent tracks j.

Memories having a small storage capacity contain a limited number of discs (normally only one or two). In small memories, data are stored, i.e., recorded, on each of the disc faces by setting a large amount of space aside for the data intended to be processed by the data processing system of which the memories are a part. A small amount of space is set aside for data that enables the tracks to be located; these data indicate the track addresses and enable the magnetic head to be servo controlled to a position above the tracks. In the small area are also stored data which indicate whether or not the tracks contain faults.

For the sake of simplicity, a memory is considered which contains only a single disc. Preferably, each face of the disc is associated with a single magnetic read/write head, i.e., a magnetic read/write transducer. Current practice, as described in commonly assigned United States patent application Ser. No. 765,058, filed on Feb. 2, 1977, entitled "Method of Writing Addresses on a Magnetic Recording Medium", is for the data contained on each face of the disc to be distributed over equal adjacent circular sectors $S_0, S_1 \ldots S_i \ldots S_n$. Generally, one face of a disc is divided into several tens of sectors (usually 40 to 50).

When the magnetic disc face associated with the magnetic head passes in front of the head, sectors $S_0, S_1, S_2$, etcetera, are read by the head in sequence. It is therefore said that sector $S_0$ precedes sector $S_1$, that sector $S_1$ precedes sector $S_2$, that sector $S_i$ precedes sector $S_{i+1}$, and so on. In more general terms, if two items of information $I_{k-1}$ and $I_k$ which follow one another along the same track j on the face are considered, item $I_{k-1}$ precedes item $I_k$ if item $I_{k-1}$ is read by the head before $I_k$, or that item $I_k$ follows item $I_{k-1}$.

The same reasoning is applied to groups of information items $G_k$ and $G_{k-1}$ in a track (j+1) adjacent and abutting with track j.

Each sector $S_i$ is divided into two unequal areas. The larger area contains the data to be processed by the data processing system of which the disc memory is a part, while the smaller area contains data for locating the tracks and indicating faults. For the sake of simplicity, the data contained in the larger area is referred to as "data to be processed". In each sector, the smaller area is divided into a plurality of reference zones, one for each track so each track is associated with a single reference zone.

It is recalled that a bit is a binary 1 or 0 digit. The 1 or 0 may be expressed on a magnetic medium or as an analog or logic electrical signal. A logic signal is capable of assuming only two values called "logic or binary zero" and "logic or binary one"; an analog signal is a signal having a voltage that may vary continuously between two positive and/or negative extreme values. Any item of data or information recorded on the disc is referred to herein as a "bit".

To record a series of data items on a magnetic disc, a succession of small magnetic domains termed "elementary magnets" are formed on each track. These domains are distributed along the entire length of the track and have magnetic inductions with the same modulus and of successively opposing senses in a direction parallel to the surface of the disc. A data bit is represented by a change in the sense of magnetic induction, also termed a magnetization sense change. There are two different types of sense changes, namely:

when the magnetic head passes successive elementary magnets having negative and positive induction on the disc, the magnetization sense change is positive; and when, on the other hand, the head passes successive elementary magnets having positive and negative induction, the magnetization sense change is negative.

The address of a track contains a number (p) of bits such that $2^p$ is less than or equal to the number of tracks n. Each reference zone in sector $S_i$, associated with a track having an address j, contains n cells (n being a whole number) $C_1, C_2 \ldots C_k \ldots C_n$. The cells are preferably arranged so each of a number (p) of cells contains two bits; one bit represents a portion of position control information, while the second bit represents a portion of the address for the track of serial number j. Another type of cell contains two fault-indicating bits which indicate whether a portion of track j within sector $S_{i+1}$ (following sector $S_i$) does or does not contain faults. The cells are described in further detail in the commonly assigned United States patent application entitled "Method of Writing Information Relating to Faults in a Magnetic Recording Medium" filed as Ser. No. 835,402 on Sept. 21, 1977.

The two magnetization sense changes which correspond to the two bits of each cell are of the same kind. Each change can occupy one of only two predetermined positions in the cell. The value of the bit represented by the change depends upon the position which the change occupies, as described in the above mentioned patent application Ser. No. 765,058. Thus, if a cell in a reference zone containing track locating data is considered, the position-control bit corresponds to the first change while the track address bit for the zone is the second change. If the magnetization sense change corresponding to the address bit occupies a first position (the position first encountered by the magnetic read head when the face of the magnetic disc which is associated with the head passes in front of it) the bit is equal to 0. If the change in magnetization occupies the other of the two predetermined positions, termed the "second position", the bit is equal to 1. The same rules apply both to the position-control bits and to the fault indicating data.

When the magnetic head encounters a series of magnetization sense changes representing a reference zone, it emits a series of analog signals which are shaped into a series of logic pulses by shaping circuits. The beginning of a reference zone is indicated by a special pulse.

To convert a magnetic transition in a reference zone to an analog pulse and thence into a binary logic pulse, it is necessary for the analog pulse amplitude to be above a certain threshold level. In current practice, the threshold is relatively low and is typically about 25% of the maximum amplitude of an analog signal derived by a read head. The value of a track identifying bit in the reference zone is determined in the manner described in French Patent application No. 76.28169, entitled "Method of Reading Addresses on a Magnetic Recording Medium and Arrangement for Putting it into Practice", commonly assigned with the present application. In particular, track identifying bits in reference zones are determined in accordance with the prior art by the time position of a logic pulse corresponding to a magnetic polarity translation relative to a logic pulse indicating the beginning of the reference zone. Hence, in the prior art the magnetic transition $P_k$ corresponding to a binary bit $I_k$ in a reference zone has a logic pulse associated with it. The logic pulse occupies a clearly defined time position $P_k$ with regard to a special pulse indicating the beginning of the reference zone.

A spurious signal from a reference zone is defined in the present specification and claims as any signal which is derived by a magnetic head when the reference zone is passing in front of the head, but which does not correspond to a reference zone magnetic polarity transition. Hence, a spurious signal is any signal which does not occupy one of the positions $P_k$. Spurious signals occur for various reasons, such as a variation in the position of a magnetic reading head relative to a disc face associated with the head. Also, spurious signals may occur because the magnetic transitions are not properly recorded on the disc face, or because of the presence of dust between the disc face and magnetic reading head.

There are certain disadvantages concerning the way in which data have been written into reference zones of magnetic discs in the past. In particular, the relative linear speed of tracks on the disc and the magnetic read head varies, as a function of track radial position, whereby the track versus head linear speed decreases as the disc center is approached. In consequence, there are uncertainties in determining the positions $P_k$ of pulses corresponding to transitions $T_k$ in a reference zone. There are also variations in the duration and amplitude of the logic or analog pulses derived in response to output signals of the magnetic reading head. These variations result in a relatively high probability that read/write circuits of the disc memory will respond to a spurious signal and thereby provide an erroneous output.

In the prior art, signals derived from a magnetic head associated with a magnetic disc face and which represent track identifying information from a reference zone are supplied to an apparatus for positioning the head above the disc. The head positioning apparatus enables the head to be moved radially from a first track A, above which the head is initially situated, to a second track B, from which it is desired to read information. The track positioning apparatus also enables the magnetic head to be held exactly centralized above track B for the time required to read information from it. To enable information from track B to be read from the head as quickly as possible and with maximum accuracy, the time required for the head to move from track A to track B should be as short as possible. It is necessary, however, not to read information until the head arrives at track B, at as centralized portion relative to the track as possible. To meet these conditions, none of the signals read from the reference zone should be of a spurious nature and they must correspond to transitions in the zone.

DISCLOSURE OF INVENTION

The present invention enables these disadvantages to be overcome by defining first and second binary bits in a reference zone as cells having differing numbers of magnetic polarization transitions, wherein the number of transitions associated with one of the cells may be zero. In a particular embodiment of the invention, cells representing binary bits having a first value have no magnetic polarity transitions, while cells representing binary bits having the second value have two magnetic polarity transitions.

The value of a binary information bit is thus determined by the presence or absense of a pair of transitions derived from a head as it traverses a particular cell. Hence, the invention is directed to a magnetic recording medium comprising an elongated record track along which are longitudinally positioned cells of substantially equal length to represent binary bits having first and second values. The cells representing the first and second values have $N_1$ and $N_2$ magnetic polarity transitions, where $N_1$ differs from $N_2$ and includes the number zero. In the preferred embodiment, $N_1$ equals any of zero and the even integers and $N_2$ equals any of the even integers, other than zero. A magnetic recording medium having data recorded in this manner enables errors in determining the values of binary bits to be minimized, and is thus relatively reliable and safe. In addition, the present invention is easier to put into practice than the prior art.

In accordance with another aspect of the present invention, a digital storage device comprises a magnetic storage medium having a plurality of elongated, substantially parallel magnetic tracks. In the preferred embodiment, the medium is a magnetic disc and the substantially parallel magnetic tracks are concentric tracks on the disc. Adjacent tracks have abutting elongated edges. Each of the tracks includes a plurality of elongated cells of substantially the same length, with corresponding cells of adjacent tracks being longitudinally and arcuately aligned. Each of the cells represents a binary bit having first and second values respectively having $N_1$ and $N_2$ magnetic polarity transitions. The transitions occurring in each cell for binary bits having the same value occur at the same relative place within the cell. A magnetic head for reading the magnetic transitions is positioned to straddle a pair of adjacent tracks simultaneously as the tracks are moved longitudinally relative to the head.

In the preferred application, the cells represent data in reference zones of each track. Each reference zone includes several successive preamble binary bit representing cells followed by plural successive binary bit representing track address cells and multiple successive binary bit head positioning cells to enable the head to be positioned so it centrally straddles the abutting tracks.

Each of the preamble cells has magnetic polarity transitions representing the second binary bit value. Successive cells along the lengths of the first abutting tracks represent addresses of the first and second tracks and are coded in Gray code so that all pairs, except one, of the aligned address cells of the first and second abutting tracks have a like number of aligned magnetic polarity transitions. The excepted pair of the aligned address representing cells have differing numbers of magnetic polarity transitions. The aligned head positioning cells of the abutting tracks have differing numbers of magnetic polarity transitions to represent the first and second binary values. The even and odd head positioning cells of the first track respectively represent the first and second binary values. In contrast, the odd and even numbered head positioning cells of the second track respectively represent the first and second binary values.

It is, accordingly, an object of the present invention to provide a new and improved magnetic recording medium and device.

Another object of the invention is to provide a magnetic recording medium wherein binary bits are represented by the number of magnetic polarity transitions within a binary bit representing cell.

A further object of the invention is to provide a magnetic recording medium for digital signals wherein signals read from the medium are relatively immune to spurious signals.

Still another object of the invention is to provide a magnetic recording medium for digital data wherein the data are represented in a relatively inexpensive and facile manner.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 6 is a schematic diagram indicating the manner in which a number of successive cells are assembled together to form preamble, address and position controlling regions in a reference zone in accordance with the invention;

FIG. 7 is a schematic indication of the manner in which successive cells in the preamble region are arranged;

FIG. 8a is a schematic indication of the addresses in the reference zone of a pair of adjacent tracks of a magnetic disc memory;

FIG. 8b is a schematic indication of the manner in which the binary bit values represented in FIG. 8a are represented by magnetic transitions on the disc;

FIG. 8c is an illustration of waveforms derived by a head positioned centrally of the tracks illustrated in FIG. 8b;

FIG. 9a is a schematic indication of magnetic transitions in the positioning regions of a pair of abutting tracks of the reference zone; and FIG. 9b is an illustration of the waveforms derived from a head straddling the two tracks illustrated in FIG. 9a.

BEST MODE FOR CARRYING OUT THE INVENTION

Figure 1:
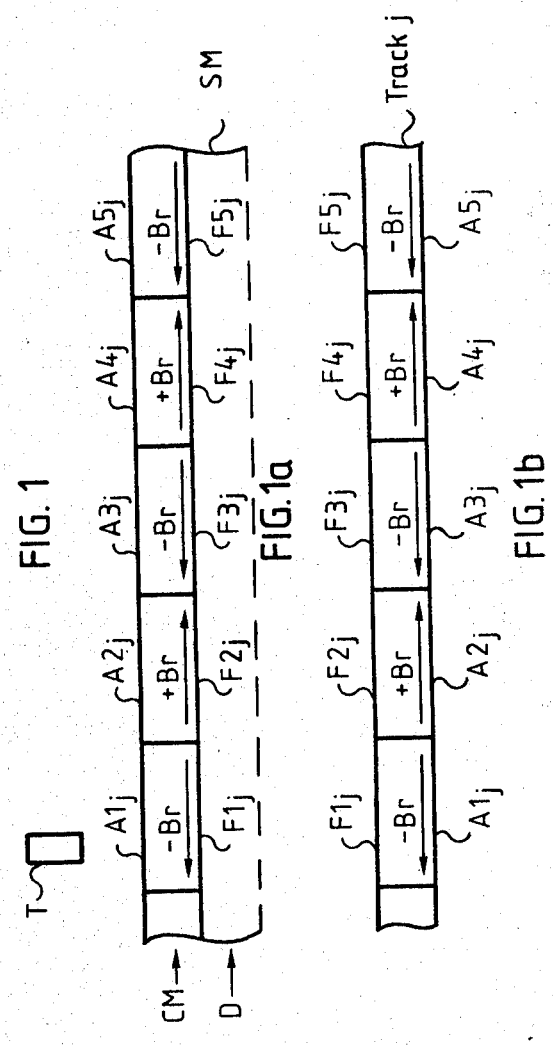
FIG. 1 is a simplified diagram indicating the manner in which information is written on magnetic recording medium, such as a magnetic disc, with FIGS. 1a and 1b respectively being sectional and top views of the disc.
Figure 2:
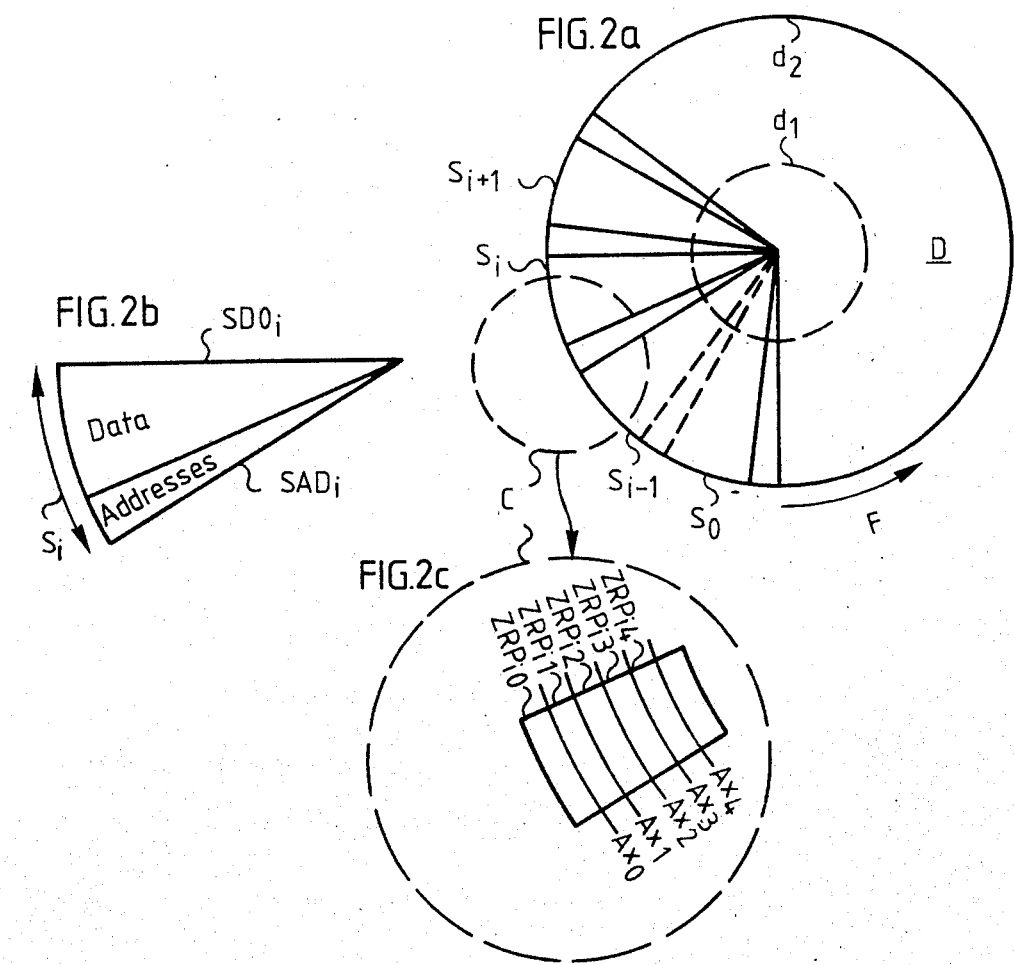
FIG. 2 consisting of FIGS. 2a, 2b, 2c and 2d is a schematic illustration of the manner in which distribution of data on the surface of a magnetic disc.
Figure 3:
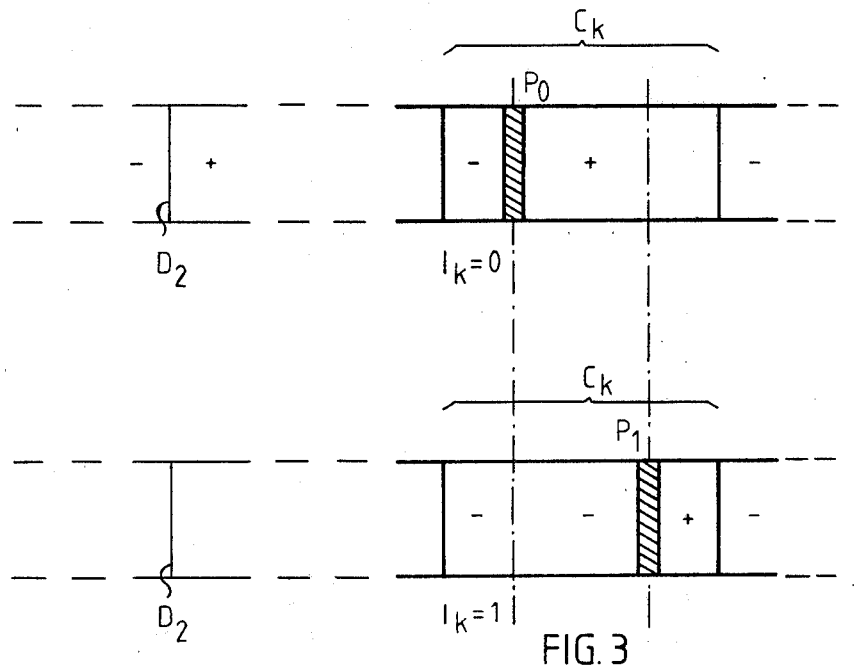
FIG. 3 is a schematic indication of how binary zero and one bits are written in cells in accordance with the prior art.

In order to provide a better understanding of how data are written in the reference zones of a magnetic recording medium in accordance with the invention, it is useful to review a few points illustrated by FIGS. 1, 2 and 3. In FIGS. 1 and 2 are illustrated the manner in which data are written on and distributed over the surface of a magnetic recording medium, preferably a magnetic disc; FIG. 3 is an illustration of a prior art method of distributing data written in a reference zone. In FIGS. 1a and 1b is illustrated a portion (represented by a rectangle) of a data track having serial number j on a magnetic disc D forming part of a magnetic disc memory. The magnetic disc D comprises a non-magnetic metal carrier SM on which is deposited a thin layer of magnetic material CM. To magnetize magnetic material CM, the material is initially subjected to a magnetic field, H, generated by a magnetic read/write head. The strength of the field is sufficient to saturate material CM; that is the field strength has a sufficient value $H_s$ to cause material CM to reach a limiting value of magnetic induction, $B_s$. Magnetic field H is then reduced to zero. There then remains within material CM residual non-zero induction $B_r$, having a value dependent on the magnetic material used.

To write data along each track j on the disc D, a plurality of elementary magnets $A_{1j}$, $A_{2j}$, $A_{3j}$, $A_{4j}$, $A_{5j}$, etcetera, are established by a magnetic read/write head T. Magnetization poles $F_{1j}$ to $F_{5j}$, which define the direction and sense of the magnetic induction in elementary magnets $A_{1j}$ to $A_{5j}$, are parallel to carrier SM and successively of opposite senses. Thus, the sense of pole $F_{1j}$ is opposite from the sense of pole $F_{2j}$; the sense of pole $F_{2j}$ is opposite from the sense of pole $F_{3j}$; and so on. The value of the magnetic induction in elementary magnets $A_{ij}$ to $A_{sj}$ is equal to $(+B_r)$ or $(-B_r)$. If the value of the induction in magnet $A_{1j}$ is $(+B_r)$, the value of the induction in adjacent magnet $A_{2j}$ is $(-B_r)$ and so on. The length of elementary magnets $A_{1j}$ to $A_{sj}$ may vary.

Disc D, FIG. 2, rotates counterclockwise in the direction of arrow F and has a useful recording area bounded by inner and outer circles $d_1$ and $d_2$, respectively. On disc D are defined n equal and adjacent sectors $S_0$, $S_1$, ... $S_i$ ... $S_n$ of disc D. As seen in FIG. 2b, each sector $S_i$ is divided into two parts $SDO_i$ and $SAD_i$ having areas such that $SDO_i$ is much larger than $SAD_i$. In part $SDO_i$ are recorded data to be processed by a data processing system of which the disc memory is a part; in part $SAD_i$ are recorded track locating data (the addresses of the tracks and the data for controlling the position of the magnetic head T relative to the tracks)

and data indicating whether or not any of the tracks in the adjoining sector $S_{i+1}$ contain faults.

FIGS. 2c and 2d are enlarged views of a portion of part $SAD_i$ contained in circle C, FIG. 2a. Each $SAD_i$ part of sector $S_i$ is divided into N zones $ZRP_{i0} \ldots ZRP_{ij} \ldots ZRP_{i(N-1)}$. For the sake of simplicity only the first five zones $ZRP_{i0}$ to $ZRP_{i4}$ are shown and are represented as rectangles. The boundaries between the various reference zones $ZRP_{ij}$, are the circular magnetic axes $Ax_j$ of the recording tracks of the magnetic disc D. In each sector $S_i$, a track having serial number j and circular axis $AX_j$ is associated with a reference zone $ZRP_{ij}$. Thus, track 0 is associated with reference zone $ZRP_{i0}$, track 1 is associated with zone $ZRP_{i1}$ and so on.

In a prior art arrangement illustrated in FIG. 3, binary bits in a reference zone on a magnetic disc are contained in a set of elementary cells $C_k$. Each zone $ZRP_{ij}$ contains a set of such elementary cells. The number of elementary cells in each reference zone is at least equal to the number of track identifying or track address bits for the zone. In FIG. 3, an elementary cell $C_k$ of reference zone $ZRP_{ij}$ is positioned relative to the beginning DZ of the reference zone. The beginning DZ of zone $ZRP_{ij}$ is indicated by a first, magnetic transition.

Cell $C_k$ of reference zone $ZRP_{ij}$ contains two opposite polarity elementary magnets spaced along the length of the reference zone, from the beginning DZ of the zone. Hence, there is a single magnetic polarity transition in cell $C_k$. The position of the transition within cell $C_k$ indicates the binary value of the bit associated with the cell. The transition can occur at a first point $P_0$ one-third of the way through the cell length, or it can occur at a second position $P_1$ two-thirds through the length of the cell. The transitions at positions $P_0$ and $P_1$ respectively represent binary bits having the values of 0 and 1. The polarity transition within cell $C_k$ is always in the same direction. For the situation illustrated in FIG. 3, the transition is always from negative to positive, whereby the magnetic polarity in the first and last one-third of cell $C_k$ is always negative and positive respectively. The magnetic polarity in the middle one-third of the cell is either positive or negative depending upon whether the cell represents a binary zero or one value.

Figure 4:
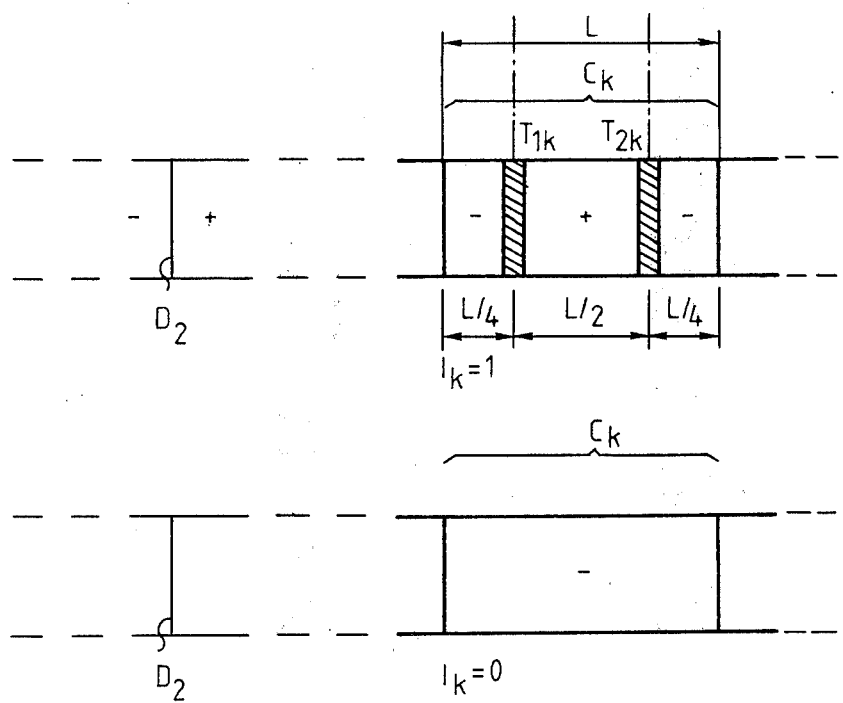
FIG. 4 is a diagrammatic illustration of the manner in which binary one and zero bits are written on a magnetic track in accordance with the present invention.

In accordance with the present invention, binary bit values are written into the reference zone of a magnetic disc in a manner illustrated in FIG. 4. In particular, in FIG. 4 there is illustrated a portion of a reference zone $ZRP_{ij}$ including an elementary cell $C_k$ which is displaced from an initial magnetic transition DZ at the beginning of the reference zone. The reference zone contains a plurality of successive elementary cells $C_1$, $C_2 \ldots C_k \ldots C_n$, spaced in sequence from magnetic transition DZ. The number of cells in reference zone $ZRP_{ij}$ is at least equal to the number of bits required to identify a track in which reference zone $ZRP_{ij}$ is located.

In accordance with the invention, binary zero and one bit values for a cell $C_k$ have differing numbers $N_1$ and $N_2$ of magnetic polarity transitions, where $N_1$ can include the integer 0. In a preferred embodiment, a binary one value is represented by a cell having two transitions, while a binary zero value is represented by a cell having no transitions. The binary one values are represented by cells having magnetic polarities of minus, plus and minus in the first, second and third segments of each of the cells, while binary zero values are represented by cells having negative magnetic polarity.

For convenience, the presence or absence of a double magnetic transition is referred to by the name "DIBIT". All of the cells $C_1 \ldots C_k \ldots C_n$ in a particular reference zone have the same length L. In cells representing binary one values, the first transition from minus to plus occurs one-quarter of the way through the length of the cell, while the second transition from plus to minus occurs three-quarters of the way through the cell, whereby the length of positive magnetic polarity and negative magnetic polarity in the cell is the same. Thereby, the magnetic flux induced in a head reading the cell has a net value of zero, assuming that the head is centrally positioned above the track containing the cell. The resulting waveform derived from the head for a cell $C_k$ representing a binary one value is thus approximately a 360 degree sinusoid with a zero average value. In response to the magnetic reading head passing over a cell with no transitions, which represents a binary zero value, the head produces an output waveform that is substantially constant at a zero value.

Figure 5A:
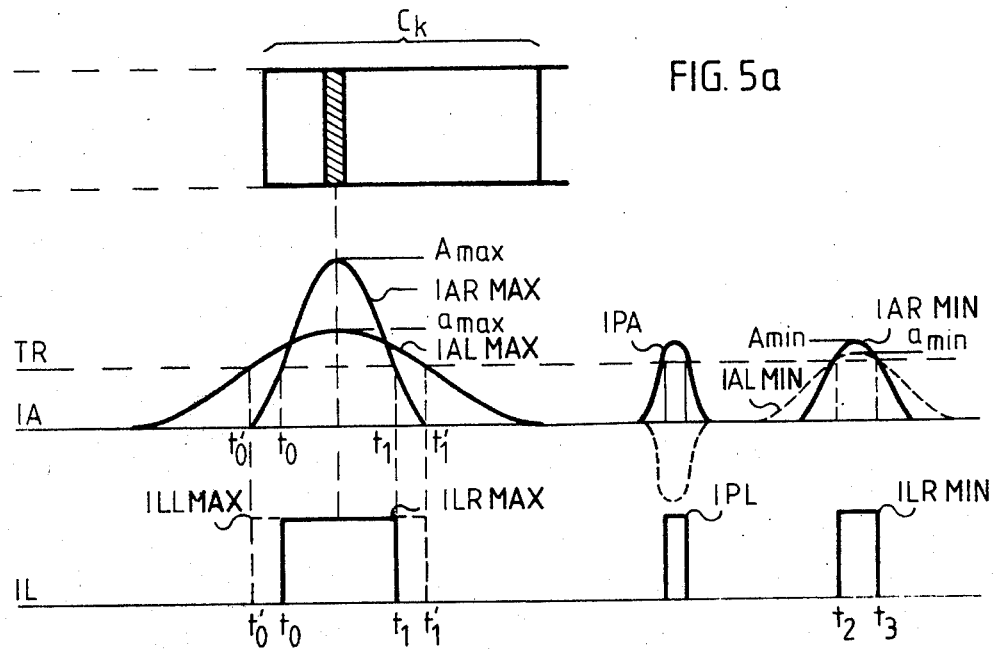
FIG. 5a is a series of waveforms indicating the nature of output signals of a magnetic read head in accordance with the prior art.
Figure 5B:
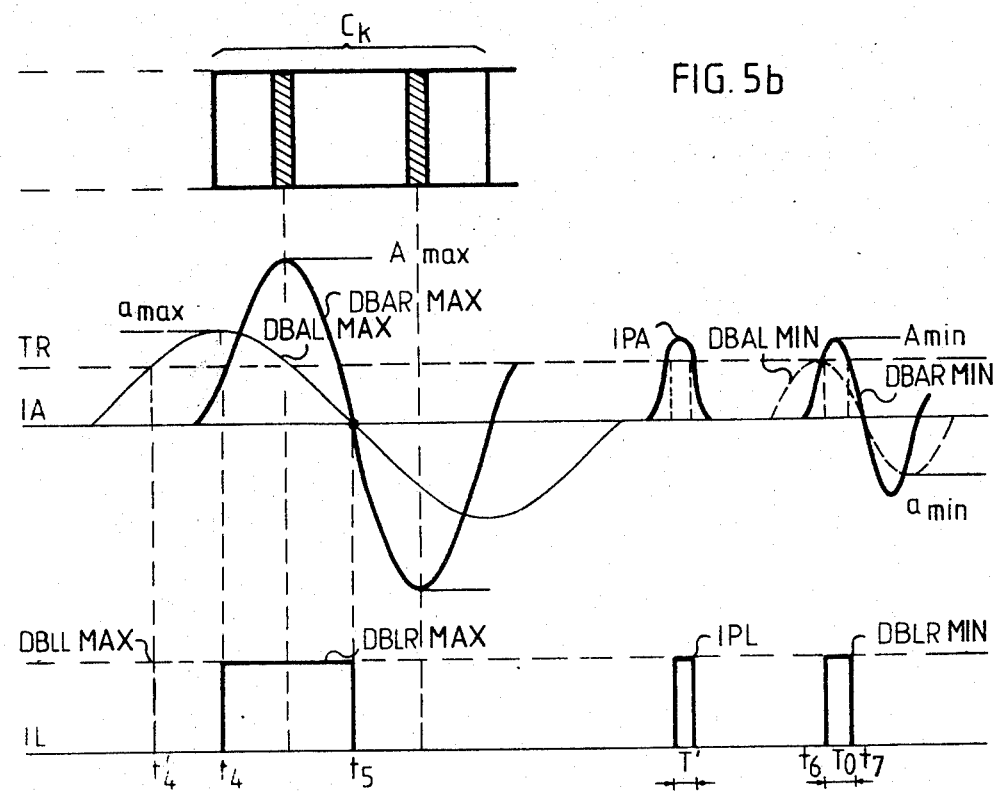
FIG. 5b is a series of waveforms derived from a head reading a disc in accordance with the present invention.

Reference is now made to FIGS. 5a and 5b, respectively waveforms of analog and digital signals corresponding to bits $I_k$ as recorded in accordance with the prior art (FIG. 3) and in accordance with the present invention (FIG. 4).

Considering the waveforms derived by a magnetic pick-up head in response to the binary zero bit recorded in accordance with the prior art, as illustrated in FIG. 5a, such a waveform may have several different shapes, exemplary ones of which are illustrated on the second line of FIG. 5a. The waveforms derived by the magnetic reading head are converted into binary or logic signals, having shapes as indicated in the third line of FIG. 5a.

The amplitude and wave shape of the output signal of the magnetic read head are functions of the radial position of a track on the magnetic disc and the position of the read head relative to the track. In particular, the maximum amplitude of the signal derived from the head is a function of the head position relative to the center of the disc because linear speed of a track increases as a function of increasing radius. The amplitude of the signal derived from the head is also a function of whether the head is centrally positioned over the track or not. If the head is centrally positioned over the track and in close proximity to the plane of the disc, the head derives a signal having a relatively narrow half-wave sinusoidal-like representation with a high peak amplitude. In contrast, if the head is not centrally position over the track, and or is relatively remote from the disc plane, the head derives a half sinusoidal-like waveform having a peak amplitude that is smaller than the peak amplitude of the situation which occurs for a centrally and closely positioned head. The wave shape also widens as the relative separation of the head from the plane of the disc increases.

Logic circuitry (not shown) responds to the half-sinusoidal-like waveforms derived from the magnetic head to derive bi-level, i.e., binary, signals, as illustrated in the third line of FIG. 5a. In response to the half-sinusoidal-like wave-form derived from the head exceeding a threshold level TR, the logic circuitry derives a positive, binary one level. In response to the output of the head being less than threshold level TR, the logic circuitry derives a zero level.

Hence, the half-sinusoidal waveform IARmax illustrated in the second line of FIG. 5a has a peak value of Amax. Waveform IARmax is derived in response to the head being adjacent or at the periphery of the disc, and when the head is centrally positioned relative to the track and at a minimum distance above the plane of the disc. In contrast, when the head is positioned close to the periphery of the disc, but the head is above the plane of the disc by a greater amount than the minimum spacing, the head derives a waveform IALmax. Waveform IALmax has a maximum amplitude amax considerably less than the maximum amplitude Amax of waveform IARmax. In addition, waveform IARmax is above threshold TR for a considerably smaller duration of time $(t_0-t_1)$ than the duration $(t'_0-t'_1)$ during which waveform IALmax is above threshold TR. The logic circuitry responds to threshold TR waveforms IARmax and IALmax to derive bi-level waveforms having differing durations, such that waveform IARmax is converted into waveform ILRmax having a binary one value during the duration $t_0-t_1$, while waveform IALmax is converted into a binary waveform ILRmax having a binary one level during the interval $t'_0-t'_1$.

A somewhat similar situation exists when the head is positioned close to the center of the disc, and is removed from the disc periphery, as indicated by waveforms IARmin and IALmin. As illustrated by waveform IARmin, the signal derived from the magnetic head in such a situation is relatively narrow and has a peak amplitude Amin slightly above TR when the head is positioned at the center of a track, and with a minimum spacing above the plane of the disc. If, however, the head is spaced farther than the minimum from the plane of the disc the head derives a waveform IALmin, having maximum amplitude amin that is approximately equal to threshold TR and thus is subject to erroneous detection. Waveform IARmin is converted into binary pulse IARmin, but waveform IALmin may not be so converted.

Because the prior art system makes a determination as to whether a cell represents a binary one or binary zero level as a function of a transition in magnetic polarity within the cell, the variable occurrence times of the leading and trailing edges of the binary one values derived from the logic circuit, as illustrated by the third line of FIG. 5a, result in a relatively high probability that errors occur in determining the value of a bit.

In addition, the prior art system is subject to errors in response to spurious analog pulses IPA which may result in the logic circuitry deriving a binary level pulse IPL. Pulse IPL can be derived by the logic circuit in response to the spurious magnetic pulse IPA from the read head occurring at a time when the read head is not responsive to a recorded transition and the disc is not otherwise deriving an output voltage greater than threshold TR. In such an instance, spurious pulse IPA is converted into an erroneous logic pulse IPL that is accepted by the logic read/write circuits of the disc memory of which the disc is a part. If, however, the spurious pulse IPA is derived from the magnetic head while the head is otherwise deriving a pulse greater than threshold TR in response to a recorded transition in cell $C_k$, the head output pulse greater than threshold TR is linearly combined with the spurious signal in such situation. If the spurious signal results in the head deriving a pulse that has a polarity opposite to the polarity associated with the transition of cell $C_k$, there is a relatively high likelihood of the combined head output signal being less than threshold TR. In consequence, there is a relatively high probability that the bit value associated with cell $C_k$ will not be detected and that the write/read circuits will derive an erroneous output. Hence, the track address will not be correctly detected.

The waveforms of FIG. 5b indicate how the present invention obviates the problem associated with the prior art. In response to a cell $C_k$ having two transitions so that it is associated with a binary one value, the magnetic read head derives an analog signal that is similar to 360 degrees of a sinusoid, as indicated by waveforms DBARmax, DBALmax, DBARmin and DBALmin, in the second line of FIG. 5b. Waveforms DBARmax and DBALmax are derived by the magnetic head when it is positioned at or adjacent the periphery of the magnetic disc; DBARmax occurs when the head is positioned at minimum separation above the plane of the disc, while DBALmax occurs when the head is separated from the plane of the disc by considerably more than the minimum. Waveforms DBARmin and DBALmin are derived by the head when it is at a radial position close to the center of the disc, and when there are minimum and greater than minimum separations between the head and the disc plane. The sinusoidal-like variations of waveforms DBARmax, DBALmax, DBARmin and DBALmin are converted by prior art logic circuitry into bi-level signals indicated by the waveforms of the third line of FIG. 5b. In particular, when the positive going portion of the sinusoidal-like waveforms is above a positive threshold TR, the logic circuit derives a binary one level. The logic circuit derives a binary zero output in response to the negative going portion of the waveform crossing the zero axis. At all other times, the logic circuit derives a binary zero, zero volt level. In response to the positive going portion of analog, sinusoidal-like waveform DBARmax exceeding the threshold TR, at time $t_4$, the logic circuit derives a binary one pulse DBLRmax. The logic circuit responds to the positive going portion of signal DBALmax exceeding threshold TR at $t_4$ to derive binary one pulse DBLLmax. Pulses DBLRmax and DBALmax continue until waveforms DBARmax and DBLRmax cross the zero value at time $t_5$. While the initial transitions in waveforms DBLLmax and DBLRmax occur at different times, the final transitions occur simultaneously. Waveforms DBARmax and DBALmin are converted into binary waveforms, e.g., waveform DBLRmin. The logic waveforms derived in response to pulses DBARmin and DBALmin are likely to have leading edges at different time positions, but the trailing edges thereof occur simultaneously at time $t_7$. Pulse DBARmin is converted by the logic circuit into a minimum duration logic pulse DBLRmin, having a duration $T_0$ between $t_6$ and $t_7$. All other pulses which are derived from the head and which are associated with recorded transistions on the disc have a duration greater than $T_0$.

From the second line of FIG. 5b, the negative going portions of waveforms DBALmax and DBARmax have a positive to negative transition, i.e., pass through zero, at time $t_5$. A similar positive to negative transition occurs for the waveforms DBARmin and DBALmin at time $t_7$. Hence, regardless of the radial position of the reading head, there is a positive to negative transition at the same relative time referenced to transition DZ for a cell $C_k$ having a binary one value. Thereby, regardless of the position of reference zone $ZRP_{ij}$ in a given sector $S_i$, the time interval between the beginning DZ of a reference zone and a positive to negative transition in the sinusoidal waveform for a binary one cell $C_k$ in the reference zone is constant. Because of the constant time position of a positive to negative polarity amplitude transition in the waveform derived by the magnetic head, the presence or absence of a double transition cell $C_k$ is detected by circuitry which determines whether the output of the logic network has a negative slope at time $t_5$, i.e., the value of cell $C_k$ is determined by ascertaining whether there is a negative slope at the output of the logic network at time $t_5$; stated otherwise, if the output of the logic network is returning to a binary zero state from a binary one state at time $t_5$, cell $C_k$ has a binary one value. The value of cell $C_k$ is a binary zero if the output of the logic network is constant at time $t_5$, i.e., remains at a zero level. Circuitry to detect the occurrence of the trailing edge of the output of the logic is well known, and the presence or absence of the trailing edge of the logic network at time $t_5$ is detected by electronic logic circuits currently used in practice.

The present invention is also advantageously utilized to prevent spurious pulses derived from the magnetic head from being interpreted as reference zone signals. In particular, a spurious analog pulse having a half-sinusoidal-like waveform, IPA, is not detected as a binary value, even though it has an amplitude greater than threshold TR. Analog pulse IPA is converted by the threshold circuits into a logic pulse IPL, having a pulse with T', less than $T_0$. Because of the virtually zero probability of pulse IPL having a trailing edge at time $t_5$ the pulse cannot be recognized as a binary one level. In addition, the duration T' of pulse IPL is less than the minimum period $T_0$ of the logic pulse associated with a recorded binary one value. Thereby the read/write circuits of the disc memory do not accept pulse IPL as a proper data representing signal.

The present invention thus enables track identifying information to be accurately detected, to reduce considerably the risk of error in determining the value of bits, as compared with the prior art technique for writing information into the reference zones. The present invention also virtually eliminates errors due to spurious pulses in the reference zone from being detected as binary one or zero levels.

Binary one and zero valued cells are written into the reference zone $ZRP_{ij}$ of a magnetic disc by dividing the disc into three separate, successive segments along the length of the disc tracks. At the beginning of the reference zone, immediately following transition DZ, there is initially a preamble segment PPA followed by an address segment PAD containing the serial number j of the track with which the reference zone is associated. Following segment PAD is a final segment PPOS containing information for servo-controlling the position of the magnetic head above the disc; segment PPOS is also termed a precision positioning information zone.

Distributing the information in reference zone $ZRP_{ij}$ so that segments PPA, PAD and PPOS occur in sequence after the zone beginning DZ enables the accuracy with which information is derived from the reference zone to be increased. Thereby, signals representing one type of information, such as an address, are not likely to interfere with signals representing a different type of information, as contained in segment PPOS. Such interference is likely to occur with prior art reference zone data writing procedures wherein an information item of a first type precedes an information item of a second type, which in turn precedes an information item of a third kind, etcetera.

Preamble segment PPA contains a number of successive DIBITS along the length of the track. The magnetic head and disc memory responds to the DIBITS in segment PPA to determine the gain of amplifiers included in the read/write circuits of the disc memory. Thereby, address bits and precision positioning information read from segments PAD and PPOS are read with very high accuracy. In a preferred implementation of the invention, preamble segment PPA contains 12 identical, successive DIBIT cells $C_0, C_1 \ldots C_k \ldots C_{10}, C_{11}$ representing binary one values, as illustrated in FIG. 7. Each of the cells illustrated in FIG. 7 includes a pair of magnetic polarity transitions, with transitions from negative to positive polarity being represented by lines having upwardly directed arrows, while positive to negative transitions are represented by lines having downwardly directed arrows.

Address segment PAD includes 12 successive cells selectively polarized to represent binary zero and one levels. One of the cells in segment PAD, generally the first cell $C'_0$, contains a DIBIT corresponding to the track parity. The remaining DIBITS in cells $C'_1-C'_{11}$ represent the track address associated with zone $ZRP_{ij}$ of which segment PAD is a part. If the number of bits in the track address is k, $2^k$ track addresses can be represented in segment PAD. Thus, if k=11, the maximum number of tracks which can be represented in an 11 bit binary code is $2^{11} = 2048$. In the described embodiment, the most significant address bits precede the least significant address bits as the head traverses reference zone $ZRP_{ij}$. Consequently, cell $C'_1$ contains a DIBIT corresponding to the most significant address bit, while cell $C'_{11}$ contains the least significant address bit.

Reference is now made to FIGS. 8a, 8b and 8c wherein there are respectively illustrated the binary representations for reference zones 124 and 125 of abutting tracks, the recorded magnetic polarities of the cells representing the bits, and the waveforms derived by a head reading the magnetic polarities. The addresses of tracks 124 and 125 are preferably written in reflected binary code, i.e., Gray code. A description of this code is provided, for example, on pages 253 and 254 of the book by H. Soubies-Camy, published by Editions Dunod in 1968. The Gray code is characterized by having only a single binary bit variation between adjacent decimal values. Is is preferably employed in the present invention for this reason. To simplify FIG. 8, parity cell $C'_0$ has been omitted from both zones $ZRP_{i124}$ and $ZRP_{i125}$. The DIBITS contained in each of cells $C'_1-C'_{11}$ of zones $ZRP_{i124}$ and $ZRP_{i125}$ are respectively referred to as DB1-DB11.

From FIG. 8a, it is noted that the address for zone $ZRP_{i124}$ differs from the address for zone $ZRP_{i125}$ only by the presence of a zero in the least significant bit cell for zone $ZRP_{i124}$ and a one in the least significant bit cell of zone $ZRP_{i125}$. Binary one and zero cells are represented in FIG. 8b in the same manner as described supra with regard to FIGS. 4 and 7. Hence, in FIG. 8b, cells in zone $ZRP_{i124}$ and $ZRP_{i125}$ having a binary zero value are represented as blocks having only a negative polarization, while cells representing binary one values are represented as blocks including a pair of magnetic polarity transitions, i.e., from minus to plus and plus to minus. Hence, cells $C'_5$ and $C'_{10}$ in both of zones $ZRP_{i124}$ and $ZRP_{i125}$ include two polarity transitions, while cell $C'_{11}$ in zone $ZRP_{i125}$ includes a pair of polarity transitions. All of the other cells in zones $ZRP_{i124}$ and $ZRP_{i125}$ include no transitions. Head T is positioned to straddle zone $ZRP_{i124}$ and $ZRP_{i125}$. Thereby, as head T traverses the boundary or axis $Ax_{i124}$ between zone $ZRP_{i124}$ and zone $ZRP_{i125}$ it is simultaneously responsive to magnetic transitions in corresponding cells of the two zones. Preferably, head T is positioned so that it is equally responsive to the transitions in both zones and thus is centered on axis $Ax_{i124}$.

As illustrated in FIG. 8c, head T derives a series of sinusoidal variations which can be thought of as analog pulses S5+, S5−, S10+, S10−, S+11, and S11−. Pulses S5+ and S5− correspond to the double magnetic transitions in cells $C'_5$ in the zone $ZRP_{i124}$ and zone $ZRP_{i125}$ and have the same amplitude as pulses S10+ and S10−, which represent the output of head T as it passes over cells $C'_{10}$, while on axis $Ax_{i124}$. The output of head T as it passes over cells $C'_{11}$ of zone $ZRP_{i124}$ and zone $ZRP_{i125}$ while on axis $Ax_{i124}$ is, however, one-half that of pulses S5+, S5−, S10+ and S10−. This is because there are no magnetic transitions in cell $C'_{11}$ of zone $ZRP_{i124}$ whereby the magnetic flux change induced in head T is reduced by one-half when it passes over cells $C'_{11}$ relative to each of cells $C'_5$ and $C'_{10}$. The waveform of FIG. 8c is also characterized by straight line segments for cells $C'_1$–$C'_4$ and $C'_6$–$C'_9$. This is because there are no magnetic transitions in these cells in either of zones $ZRP_{i124}$ or $ZRP_{i125}$.

Reference is now made to FIGS. 9a and 9b of the drawings wherein there are respectively illustrated the magnetic transition patterns of segments PPOS of a pair of adjacent reference zones, and the resulting waveforms derived from heads having differing positions relative to axis $Ax_{1(j-1)}$ between the zones. The zones are designated as $ZRP_{i(j-1)}$ and $ZRP_{ij}$, which are respectively associated with reference zones having odd and even addresses. Illustrated in FIG. 9a are the magnetic polarity transitions of cells $C''_1$–$C''_{12}$ of the PPOS segments of zones $ZRP_{i(j-1)}$ and $ZRP_{ij}$, as well as cell $C'_{11}$ of the address segment PAD which precedes the cells of segments PPOS. The odd numbered cells in segment PPOS of the odd numbered track $ZRP_{i(j-1)}$ have binary one values, while the even numbered cells in segment PPOS of even numbered track $ZRP_{ij}$ have binary one values. The remaining cells in segments PPOS of tracks $ZRP_{i(j-1)}$ and $ZRP_{ij}$ have binary zero values. The binary one and zero values for the cells in FIG. 9a are represented in the same manner as described supra with regard to FIG. 8b.

Thus, the even numbered tracks and the odd numbered tracks in segment PPOS contain a succession of 12 cells in which magnetic polarity transitions are alternately present and absent from successive cells. The techniques for writing binary ones and zeros into the cells of segments PPOS are identical, regardless of whether the segments are associated with even or odd numbered reference addresses. It is merely necessary to shift the information from cell to cell. Thus, the cell $C''_1$ in an even numbered track j does not contain a double magnetic transition, whereas cell $C''_1$ in an adjoining odd track, having an address of (j−1) or (j+1) contains such a transition. Cell $C''_2$ in an even numbered track contains a double transition, but cells $C''_2$ in the adjoining odd numbered tracks having addresses (j−1) and (j+1) do not contain such a transition, etcetera.

Reference is now made to FIG. 9a wherein there is illustrated the waveform which is derived from head T in response to the head being positioned on $Ax_{i(j-1)}$ between zones $ZRP_{i(j-1)}$ and $ZRP_{ij}$, while the head is scanning segment PPOS, as well as the waveform derived from the head while two-thirds of the head is situated opposite from zone $ZRP_{ij}$, and one-third of the head is positioned opposite zone $ZRP_{i(j-1)}$. The signal derived from the head while it is positioned on axis $Ax_{i(j-1)}$ while traversing cells $C''_1$–$C''_{12}$ is a true sinusoid having equal positive and negative excursions, +A2 and −A2 relative to a zero value, as indicated by waveform $SA_n$. Hence, the head response from each of cells $C''_1$–$C''_{12}$ while the head is on axis $Ax_{i(j-1)}$ and traversing segment PPOS has the same wave shape as is derived while the head is on axis $Ax_{i124}$, while scanning cell $C'_{11}$, FIG. 8. Control circuitry (not shown) for the position of head T responds to the output of the head while it is scanning segment PPOS to control the position of the head relative to axis $Ax_{i(j-1)}$. When the head derives waveform $SA_n$, its position is not varied relative to axis $Ax_{i(j-1)}$.

If, however, the head is not positioned centrally over axis $Ax_{i(j-1)}$, the head derives waveform $SA_d$. Waveform $SA_d$ for each of cells $C''_1$–$C''_{12}$ is substantially a 360 degree sinusoid. The amplitude of the positive and negative portions of the sinusoid varies from cell to cell depending upon the position of head T relative to axis $Ax_{i(j-1)}$. In the assumed situation wherein head T is two-thirds of the way above axis $Ax_{i(j-1)}$ the head derives a signal having a relatively low amplitude ($A_B$) while it is situated above the odd numbered cells $C''_1$, $C''_3$ . . . $C''_{11}$. In contrast, in response to the cell being positioned above the even numbered cells $C''_2$, $C''_4$ . . . $C''_{12}$, the head output signal is a relatively large value $A_H$. The motor control circuit responds to signal $SA_d$ while the head is over segment PPOS to servo-position the head so that it is centered on axis $Ax_{i(j-1)}$ until waveform $SA_n$ is derived.

By arranging the precision positioning bits in parts PPOS of a reference zone ZRP, it is possible to almost entirely avoid interference effects of information in two adjoining reference zones corresponding to zone $ZRP_j$ and $ZRP_{(j-1)}$ on the one hand and zone $ZRP_j$ and $ZRP_{(j+1)}$ on the other hand, while the bits are being read.

While there has been described and illustrated one specific embodiment of the invention, it will be clear that variations in the details of the embodiment specifically illustrated and described may be made without departing from the true spirit and scope of the invention as defined in the appended claims.

I claim:

1. A digital storage device comprising a magnetic storage medium including a plurality of elongated, substantially parallel magnetic tracks, adjacent ones of said tracks having abutting elongated edges, each of said tracks including a plurality of elongated cells of substantially the same length, the cells of adjacent tracks being longitudinally aligned, each of said cells representing a binary bit, the binary bits having first and second values respectively having $N_1$ and $N_2$ magnetic polarity transitions, where $N_1$ differs from $N_2$ and includes the number zero, the transitions occurring in each cell for binary bits having the same value occurring at the same relative place within the cell, and a magnetic head for reading the magnetic transitions positioned to straddle a pair of adjacent tracks simultaneously, the tracks being adapted to be moved longitudinally relative to the head, multiple successive cells along the lengths of the first and second abutting tracks providing only information to enable the head to be positioned to centrally straddle the abutting tracks, aligned head positioning cells of the first and second tracks having differing numbers of said transitions to represent the first and second binary values, the even and odd numbered head positioning cells of the first track respectively representing the first and second binary values, the odd and even numbered head positioning cells of the second track respectively representing the first and second binary values.

2. A digital storage device as claimed in claim 1 wherein a plurality of successive cells along the lengths of the first and second abutting tracks represent only track addresses, said cells being coded in Grey code so that all cells, except one, of the aligned address representing cells of the first and second tracks have a like number of aligned magnetic polarity transitions and the cells of the excepted pair have differing numbers of said transitions.

3. A digital storage device comprising a magnetic storage medium including a plurality of elongated, substantially parallel magnetic tracks, adjacent ones of said tracks having abutting elongated edges, each of said tracks including a plurality of elongated cells of substantially the same length, the cells of adjacent tracks being longitudinally aligned, each of said cells representing a binary bit, the binary bits having first and second values respectively having $N_1$ and $N_2$ magnetic polarity transitions, where $N_1$ differs from $N_2$ and includes the number zero, the transitions occurring in each cell for binary bits having the same value occurring at the same relative place within the cell, and a magnetic head for reading the magnetic transitions positioned to straddle a pair of adjacent tracks simultaneously, the tracks being adapted to be moved longitudinally relative to the head, each track including several successive preamble cells followed by plural successive track address cells and multiple successive head positioning cells to enable the head to be positioned so it centrally straddles the abutting tracks, each of the preamble cells having magnetic polarity transitions representing the second binary bit value, successive cells along the lengths of the first and second abutting tracks representing only address bits for the first and second tracks and being coded in Grey code so that all pairs, except one, of the aligned address representing cells of the first and second tracks have a like number of aligned magnetic polarity transitions and the cells of the excepted pair have differing numbers of said transitions, and the multiple successive cells along the length of the tracks containing information only to position the head containing aligned head positioning cells in the first and second tracks having differing numbers of said transitions to represent the first and second binary values, the even and odd numbered head positioning cells of the first track respectively representing the first and second binary values, the odd and even numbered head positioning cells of the second track respectively representing the first and second binary values.

4. A digital storage device comprising a magnetic storage medium including a plurality of elongated, substantially parallel magnetic tracks, adjacent ones of said tracks having abutting elongated edges, each of said tracks including a plurality of elongated cells of substantially the same length, the cells of adjacent tracks being longitudinally aligned, each of said cells representing a binary bit, the binary bits having first and second values respectively having zero and two magnetic polarity transitions, the transitions occurring in each cell for binary bits having the same value occurring at the same relative place within the cell, and a magnetic head for reading the magnetic transitions positioned to straddle a pair of adjacent tracks simultaneously, the tracks being adapted to be moved longitudinally relative to the head, multiple successive cells along the lengths of the first and second abutting tracks providing information only to enable the head to be positioned to centrally straddle the abutting tracks, aligned head positioning cells of the first and second tracks having differing numbers of said transitions to represent the first and second binary values, the even and odd numbered head positioning cells of the first track respectively representing the first and second binary values, the odd and even numbered head positioning cells of the second track respectively representing the first and second binary values.

5. In combination, a recording medium including plural elongated substantially parallel record tracks along which are longitudinally positioned cells of substantially equal length having physical variations representing binary bits having first and second values, adjacent one of said tracks having abutting elongated edges, the cells of adjacent tracks being longitudinally aligned, a head straddling an axis between a pair of abutting tracks, the physical variations and the head being such that in response to the head being moved relative to the elongated direction of the tracks the head derives an output signal having: first and second substantially equal first amplitude but opposite polarity time displaced pulses for a pair of straddled cells both having the first value, first and second substantially equal second amplitude but opposite polarity time displaced pulses for a pair of straddled cells respectively having the first and second values, and a substantially zero, constant amplitude value for a pair of straddled cells having the second value, wherein the first amplitude exceeds the second amplitude, each track including several successive preamble cells followed by plural successive track address cells and multiple successive head positioning cells to enable the head to be positioned so it centrally straddles the abutting tracks, each of the preamble cells having variations representing the second binary bit value, successive cells along the lengths of the first and second abutting tracks representing only address bits of the first and second tracks and being coded in Grey code so that all pairs, except one, of the aligned address representing cells of the first and second tracks have like variations and the cells of the excepted pair have differing variations, and the multiple successive cells along the length of the tracks containing information only to position the head containing aligned head positioning cells in the first and second tracks having different variations to represent the first and second binary values, the even and odd numbered head positioning cells of the first track respectively representing the first and second binary values, the odd and even numbered head positioning cells of the second track respectively representing the first and second binary values.

6. The combination of claim 5 wherein the output signal for a pair of straddled cells both having the first value is a waveform that is approximately one cycle of a sinusoid having a maximum value equal to the first amplitude and the output signal for a pair of straddled cells respectively having the first and second values is a waveform that is approximately one cycle of a sinusoid having a maximum value equal to the second amplitude.

7. The combination of claim 6 wherein the physical variations are magnetic and the head derives an output signal responsive to changes in the magnetic variations.

8. The combination of claim 3 wherein the physical variations are magnetic and the head derives an output signal responsive to changes in the magnetic variations, each pair of aligned cells both having the first value consisting of first and second magnetic polarity transitions at regions equally spaced from opposite edges of the cell, each pair of aligned cells both having the second value having a substantially constant magnetic flux.

9. The combination of claim 6 wherein the physical variations are magnetic and the head derives an output signal responsive to changes in the magnetic variations.

10. The combination of claim 6 wherein the physical variations are magnetic and the head derives an output signal responsive to changes in the magnetic variations, each pair of aligned cells having the first value consisting of first and second magnetic polarity transitions at regions equally spaced from opposite edges of the cell, each pair of aligned cells having the second value having a substantially constant magnetic flux.

* * * * *